United States Patent [19]
Fallin et al.

[11] Patent Number: 5,898,134
[45] Date of Patent: Apr. 27, 1999

[54] WIRE RETAINER

[75] Inventors: David L. Fallin, Cresthill, Ill.; Edward Stefanich, Monument, Colo.

[73] Assignee: Panduit Corp., Tinley Park, Ill.

[21] Appl. No.: 08/884,871

[22] Filed: Jun. 30, 1997

[51] Int. Cl.⁶ ..................................... H01B 7/00
[52] U.S. Cl. .......................... 174/135; 439/882; 248/74.1
[58] Field of Search ..................... 174/135, 168, 174/72 A, 175, 173, 101, 95, 60; 439/719, 882; 248/74.1, 74.2, 68.1

[56] References Cited

U.S. PATENT DOCUMENTS

| | | |
|---|---|---|
| 1,775,391 | 9/1930 | Fassinger . |
| 2,082,099 | 6/1937 | Cruser ........................................ 248/49 |
| 2,921,607 | 1/1960 | Caveney ................................... 138/106 |
| 2,991,038 | 4/1961 | Vitiello . |
| 3,024,301 | 3/1962 | Waleh ..................................... 174/72 A |
| 3,024,302 | 3/1962 | Coggeshall .............................. 174/177 |
| 3,126,444 | 3/1964 | Taylor ..................................... 174/101 |
| 3,197,830 | 8/1965 | Hoadley ................................. 24/16 PB |
| 3,229,029 | 1/1966 | Weiss ...................................... 174/101 |
| 3,255,987 | 6/1966 | Gatch . |
| 3,485,937 | 12/1969 | Caveney . |
| 3,705,949 | 12/1972 | Weiss . |
| 3,826,207 | 7/1974 | Sutherlan . |
| 3,890,459 | 6/1975 | Caveney .................................. 174/101 |
| 4,136,257 | 1/1979 | Taylor . |

*Primary Examiner*—Kristine Kincaid
*Assistant Examiner*—Dhiru R Patel
*Attorney, Agent, or Firm*—Mark D. Hilliard; Robert A. McCann; Michael J. Turgeon

[57] ABSTRACT

In general, a wire retainer according to the present invention includes an exterior retaining wall having a first dimension adapted to be inserted through the aperture between the resilient fingers of the wiring duct, an interior retaining wall, a projection which extends normal to the interior retaining wall, and a duct engaging portion, disposed between a portion of the interior and exterior retaining walls, for securing the wire retainer at any selected vertical height between adjacent resilient fingers, having a first dimension substantially similar to the exterior retaining wall first dimension, and a second dimension larger than the duct engaging first dimension, whereby the second dimension interferingly engages adjacent resilient fingers after insertion and one-quarter turn rotation of the wire retainer.

4 Claims, 3 Drawing Sheets

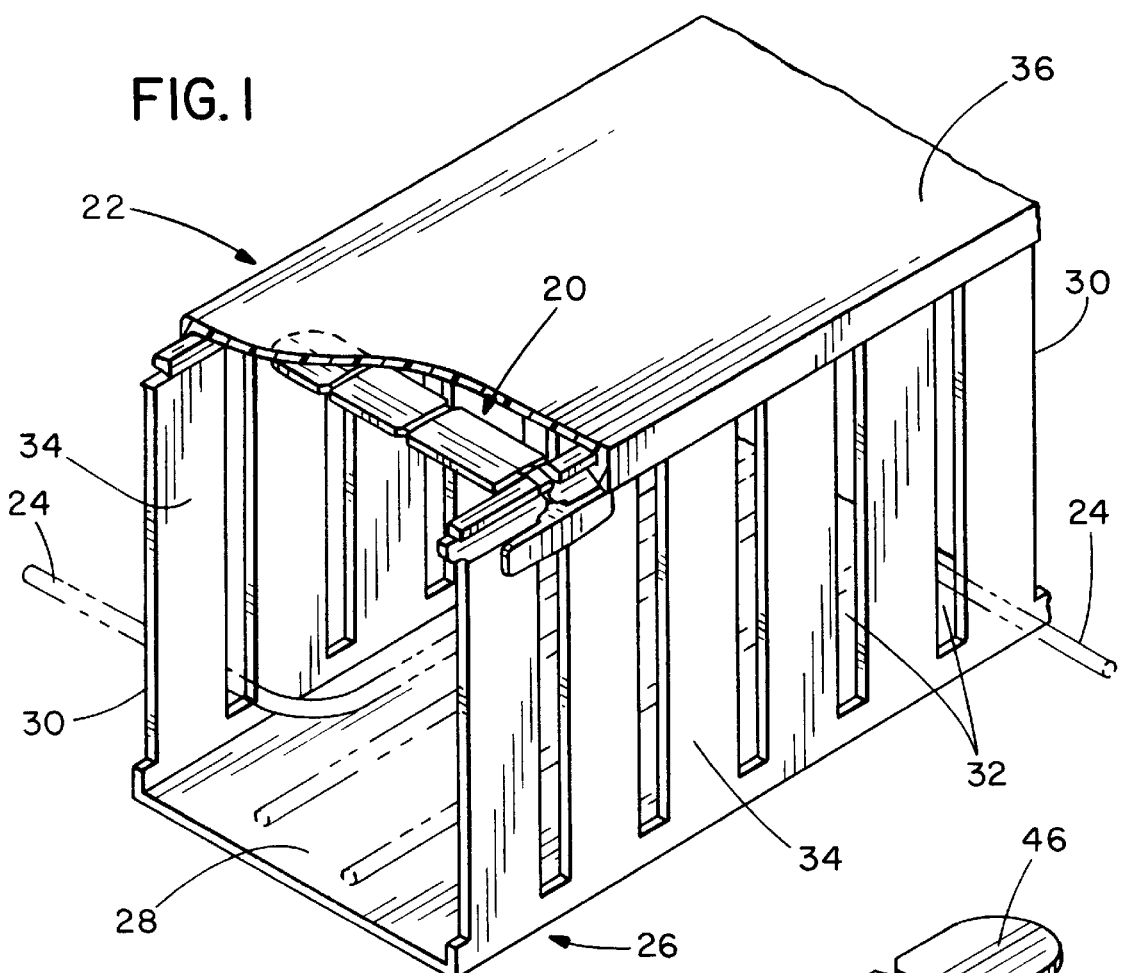
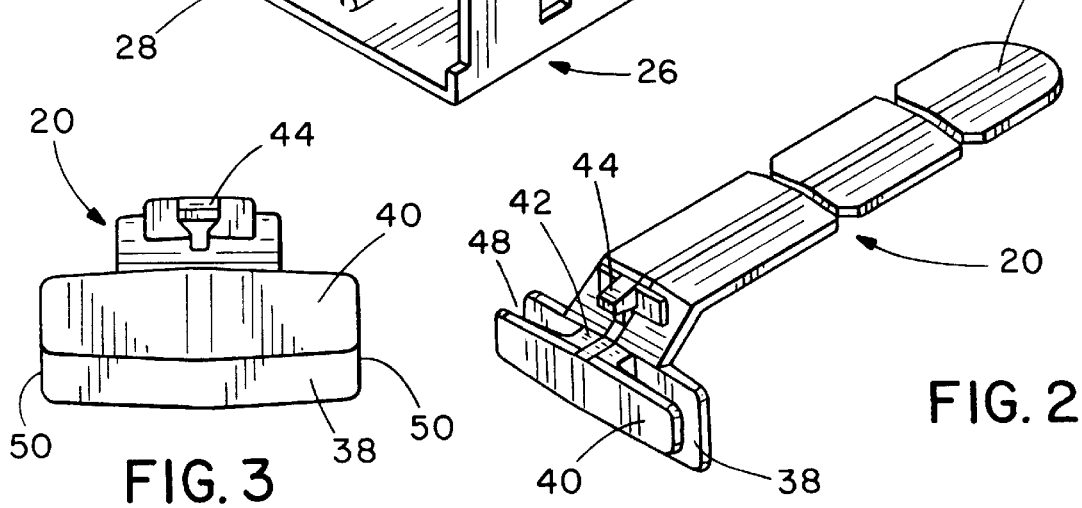
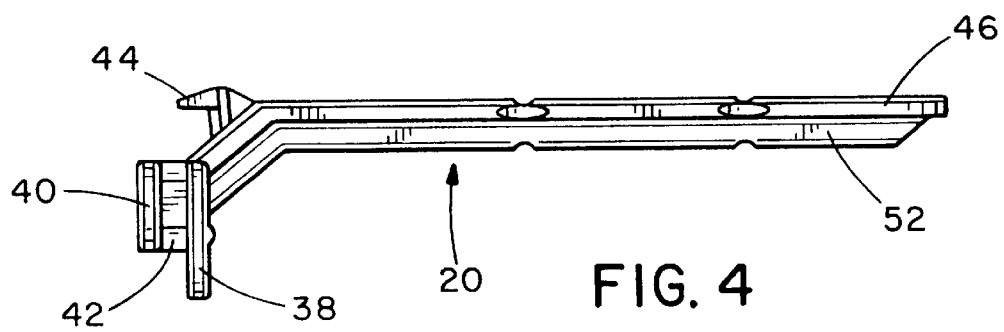

WIRE RETAINER

TECHNICAL FIELD

The present invention generally relates to retaining objects within a wiring duct and more particularly to an improved wire retainer finger which is movably secured in an aperture between any two resilient fingers of a wiring duct at any selected vertical height for maintaining wires, cables or the like with the duct.

BACKGROUND OF THE INVENTION

Wireway systems including channel-shaped ducts having upstanding fingers constituting slotted side walls have been in general use for years because of their convenience in channeling, selectively routing and retaining the various wires of a wire bundle interconnecting the components of an electrical system. These ducts typically have a cover for retaining the wires in the duct after completion of the wiring. A problem encountered with the use of such ducts is that during the wiring or when the cover is removed to permit maintenance, individual wires may tend to fall out of the duct due to the resiliency of the wires. This problem is particularly acute when the duct is nearly filled with wires or when the duct is vertically mounted.

Because of these difficulties, plastic retaining fingers have been proposed for retaining previously installed wires in the duct until the wiring is completed and the cover mounted on the duct. These various retaining fingers attach to one wall of the duct and extend partially across the duct opening.

More particularly, one such retainer has a bifurcated base portion comprising resilient legs for engaging the wall and a finger portion extending from the base portion partially across the duct opening. When such a finger is attached to the sides of adjacent upstanding fingers forming a slot in the wall, the retaining finger tends to fall to the bottom of the slot where it interferes with the introduction of additional wires in the duct. This occurs because the force applied by the resilient legs slightly deflects the upstanding fingers in the longitudinal direction of the duct. To overcome this disadvantage, auxiliary closed slots for mounting the retaining fingers are required in the individual upstanding fingers. However, the closed slots typically do not extend near the top of the duct wall, thus precluding use of the retaining finger when the duct is nearly filled with wires. Furthermore, the resiliency of the legs diminishes with repeated usage or when the retaining finger is subjected to heat, causing the plastic to soften, as when the wireway system is mounted on a hot control panel. Such a wire retainer is shown in U.S. Pat. No. 3,705,949.

Another type of retainer was proposed which was disposed between two adjacent side wall fingers. This design did not use resilient legs to engage the fingers, rather a more rigid finger design was used. This design incorporated two small plane portions, separated by the thickness of the side wall fingers, which were ratcheted between two adjacent fingers then locked into a maximum vertical height position. This is the only height position which may be selected, and if the retainer is not locked into the maximum height position, it will fall to the bottom of the duct wall where it interferes with the introduction of additional wires into the duct. Another disadvantage is the extreme ratcheting and corresponding bending of the side wall fingers which is required, and consequently makes installation very difficult. Furthermore, since the planar portions are relatively small, when the retainer is bumped or jarred, it easily becomes displaced from a mounted position. The reason for this is that the bumping or jarring action often mimics the installation procedure, thus unistallation is common. The result is a wire retainer which is limited in use, difficult to install, and easy to displace unintentionally. Such a wire retainer is shown in U.S. Pat. No. 3,890,459.

A third type of wire retainer engages a single specially-made duct finger with resilient C-shaped legs and a groove or bump engaging locking mechanism. Each duct finger has a multitude of grooves or bumps disposed thereupon to permit segmented height adjustment of the wire retainer. A projection or dog is disposed upon the wire retainer which engages the groove or bump and secures the retainer into position. However, such an arrangement does not adequately permit a maximum height selection when used with a duct cover. Furthermore, the intricate design of the wire retainer makes it difficult and expensive to manufacture. The specially required duct is also more expensive to manufacture, but necessary in order to provide selective height adjustment. The result is a wire retainer which is complicated and expensive to manufacture and only provides complete performance with one specific certain type of wiring duct. Such a wire retainer is shown in U.S. Pat. No. 4,136,257.

One major disadvantage of all of the prior art designs is that each will only work with one certain type of duct, that which is specifically manufactured for it.

Therefore, in the design of wire retainers, a less expensive, easier to manufacture and more widely applicable design is desired and improvement in the art of wiring duct wire retention is needed.

SUMMARY OF THE INVENTION

It is therefore an object of the present invention to provide an improved wire retainer finger.

It is another object of the present invention to provide a wire retainer which is inexpensive to manufacture and simple to install.

It is a further object of the present invention to provide a wire retainer which remains in position after an impact or jarring from any angle.

It is a still further object of the present invention to provide a wire retainer which may be secured into a wiring duct wall at any selected vertical height simply by dimensioning rather than a specially manufactured wire duct.

It is a still further object of the invention to provide a wire retainer which may be secured into a maximum height position with the cover in place.

It is a still further object of the invention to provide a wire retainer which may be used with different styles of duct.

In general, a wire retainer according to the present invention includes an exterior retaining wall having a first dimension adapted to be inserted through the aperture between the resilient fingers of the wiring duct; an interior retaining wall; a projection which extends normal to the interior retaining wall; and a duct engaging portion, disposed between a portion of the interior and exterior retaining walls, for securing the wire retainer at any selected vertical height between adjacent resilient fingers, having a first dimension substantially similar to the exterior retaining wall first dimension, and a second dimension larger than the duct engaging first dimension, whereby the second dimension interferingly engages adjacent resilient fingers after insertion and one-quarter turn rotation of the wire retainer.

BRIEF DESCRIPTION OF THE DRAWINGS

FIG. 1 is a perspective view of a wiring duct including cover with the wire retainer of the present invention attached thereto;

FIG. 2 is a perspective view of the wire retainer of the present invention;

FIG. 3 is an end view of the wire retainer of FIG. 2;

FIG. 4 is a side view of the wire retainer of FIG. 2;

DESCRIPTION OF THE PREFERRED EMBODIMENT

Figure 5:
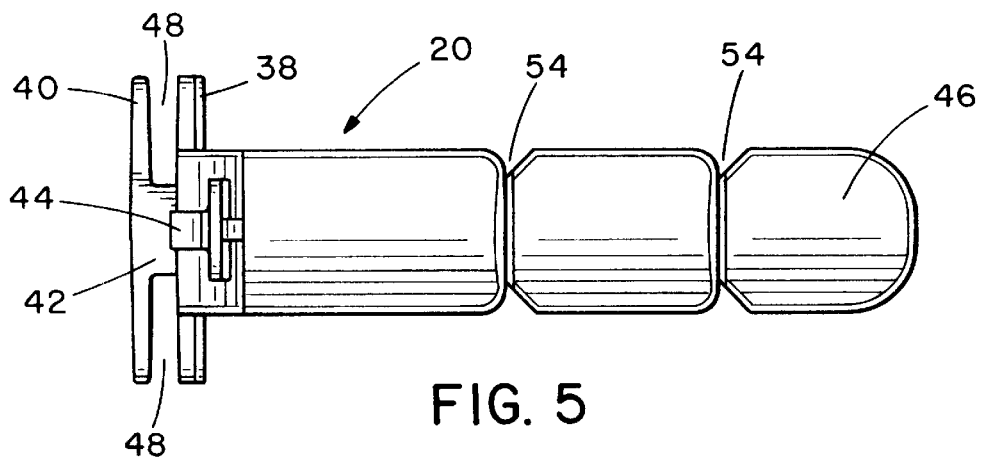
FIG. 5 is a top view of the wire retainer of FIG. 2.

A wire retainer embodying the concept of the present invention is designated generally by the reference numeral 20 in the accompanying drawings. As seen in FIG. 1, the wire retainer 20 works in cooperation with a two-piece raceway 22 to retain wires 24 therein. The U-shaped wire duct 26 preferably comprises a bottom wall 28 and upstanding side walls 30 having a plurality of apertures 32 therein defining resilient fingers 34. The apertures 32 between the resilient fingers 34 allow selected wires 24 to be extracted from the duct 26 at intervals therealong. Wire retainers 20 may be attached in the apertures 32 between the resilient fingers 34 of the duct 26 to retain and position the wires 24 within the duct 26. The wire retainers 20 are similar in construction and only one wire retainer 20 will be described hereafter. The duct 26 may be provided with a cover 36, if desired.

In accordance with the present invention, as seen in FIGS. 2–5, each wire retainer 20 preferably comprises an interior retaining wall 38, exterior retaining wall 40, duct engaging means 42, maximum height snap 44, and projection or finger 46. A pair of grooves 48 are formed between the interior and exterior retaining walls 38 and 40 on either side of the duct engaging means 42 to receive the resilient fingers 34 during installation.

The interior retaining wall 38 is preferably considerably larger than the exterior retaining wall 40 and the prior art to help stabilize the wire retainer 20 after being installed. The considerable surface area prevents the wire retainer 20 from being dislodged or uninstalled when jarred, bumped or hit from any angle, as opposed to the prior art devices. The sides 50 of the interior retaining wall 38, when installed, extend along the longitudinal axis of the duct a distance at least over one-half the width of one finger 34 in each direction. As a result, when the wire retainer 20 is installed, interior retaining wall 38 resists lateral and longitudinal deflection and will not be unintentionally displaced.

Projection or finger 46 is preferably reinforced with a stiffening rib 52 along its length. Additionally, cut notches 54 are formed perpendicularly at desired locations along the length thereof to provide length adjustability.

Figure 7:
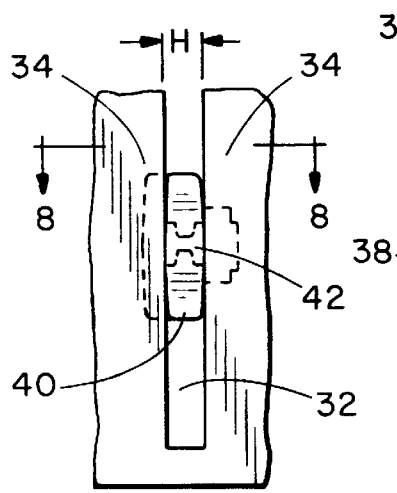
FIG. 7 is an end view of the wiring duct wall fingers and wire retainer of FIG. 2 during the initial step of installation.
Figure 9:
FIG. 9 is an end view of the wiring duct wall fingers and wire retainer of FIG. 2 during the secondary step of installation.
Figure 10:
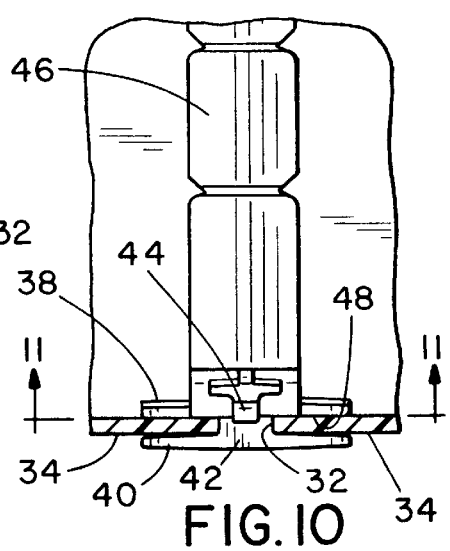
FIG. 10 is a top view of the installed wire retainer of FIG. 2.
Figure 11:
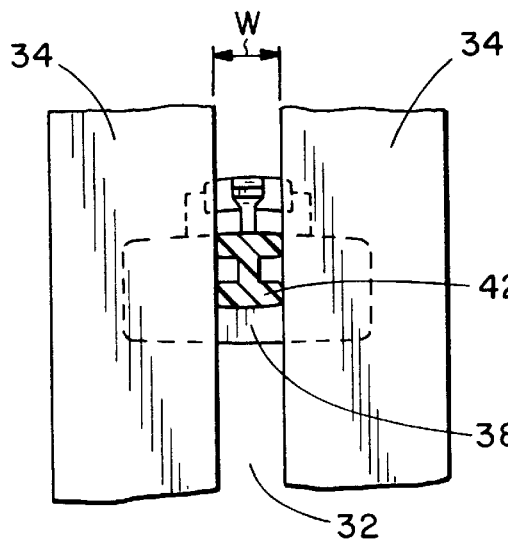
FIG. 11 is a sectional view of the installed wire retainer of FIG. 10 taken along line 11—11.
Figure 12:
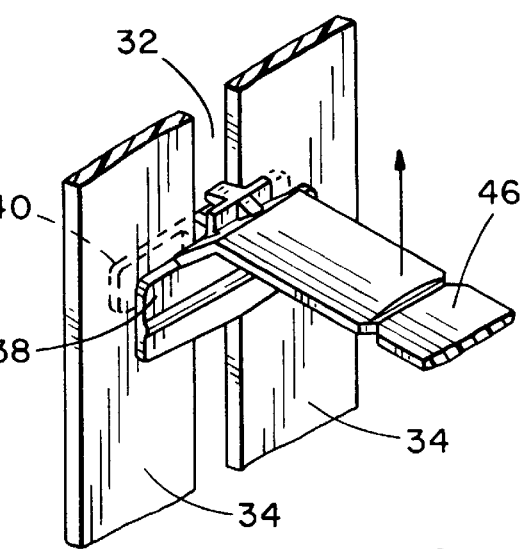
FIG. 12 is a broken away perspective view of the installed wire retainer of FIG. 2 being adjusted into its desired position.
Figure 13:
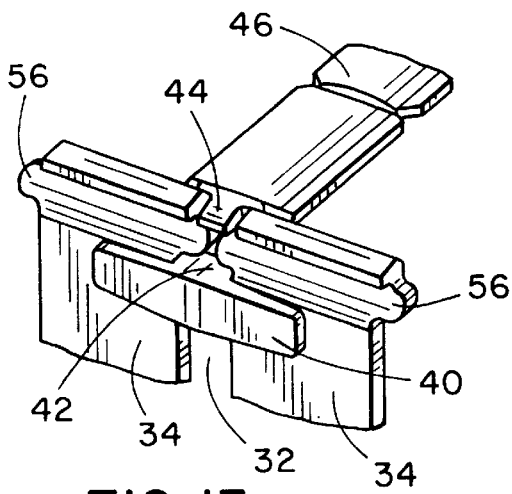
FIG. 13 is a perspective view of the installed wire retainer of FIG. 2 adjusted to its maximum vertical height position.
Figure 14:
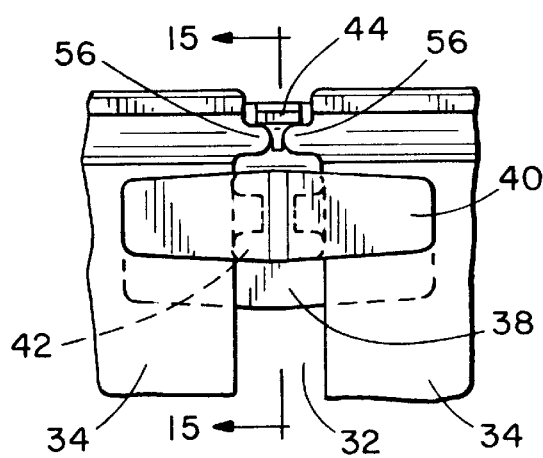
FIG. 14 is an end view of the installed wire retainer of FIG. 2 adjusted to its maximum vertical height position.

Duct engaging means 42 preferably has an I-shaped cross-section, FIGS. 7, 9 and 11, in which the first or height dimension H measured between the ends or the height of the "I", is slightly less than the second or width dimension W measured across an end or the width of the "I". The different dimensions permit the retainer 20 to be inserted easily, first dimension H loosely fits through aperture 32, yet retained securely, second dimension W interferingly engages resilient fingers 34, at any desired vertical height. The cross-section, however, may be any shape, such as square or oval, as long as one measured dimension is slightly larger than the other.

Figure 6:
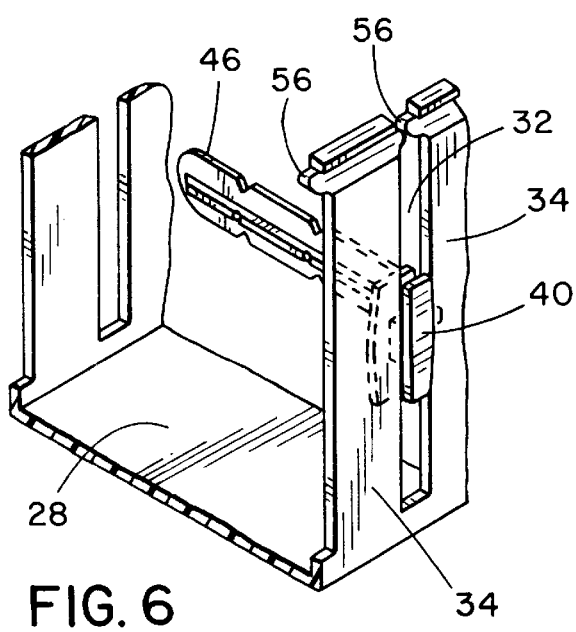
FIG. 6 is a perspective view of the wiring duct and wire retainer of FIG. 2 during the initial step of installation.
Figure 8:
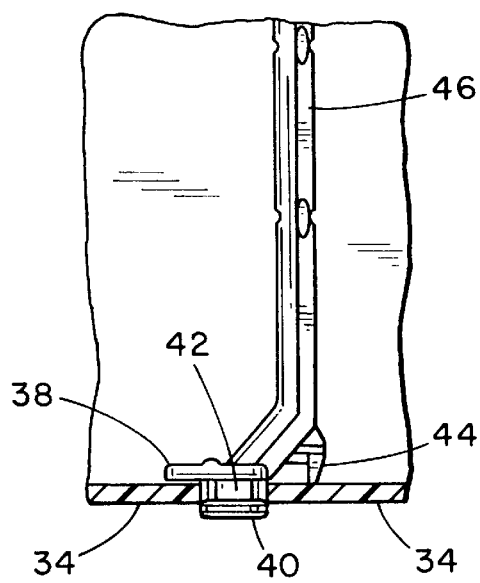
FIG. 8 is a sectional view of the wiring duct wall fingers and wire retainer arrangement of FIG. 7, taken along line 8—8.

The wire retainer 20 is simply installed on the duct 26 with one hand, as seen in FIGS. 6–14. The initial step, FIGS. 6–8, is to insert the exterior retaining wall 40 into an aperture 32 between two adjacent fingers 34, such that the wall 40 is disposed outside the side wall 30. The wall 40 is shaped and contoured such that a first dimension thereof fits through the aperture 32. The height dimension H, which is substantially similar to the first dimension of wall 40, of the duct engaging means 42 has been appropriately sized to loosely fit within the aperture 32. Upon full insertion, the interior retaining wall 38 abuts the inside of a side wall 30 and the duct engaging means 42 is disposed between adjacent resilient fingers 34.

The next step, FIGS. 9–14, is to rotate the wire retainer 20 ninety-degrees, such that the second or width dimension W engages the adjacent resilient fingers 34 in an interference fitting manner. During such rotation, the resilient fingers 34 are slightly deflected, FIG. 9, as a result of the larger diagonal dimension. The fingers 34 are received within the grooves 48 disposed on either side of the duct engaging means 42. After rotation, the wire retainer 20 is now locked or secured into a vertical position, which may be changed by pulling the retainer 20 upward, FIG. 12, or pushing downward. However, the retainer 20 will not move without the appropriate force applied thereto. Further, the retainer 20 may be completely removed and re-installed in a different position.

Figure 15:
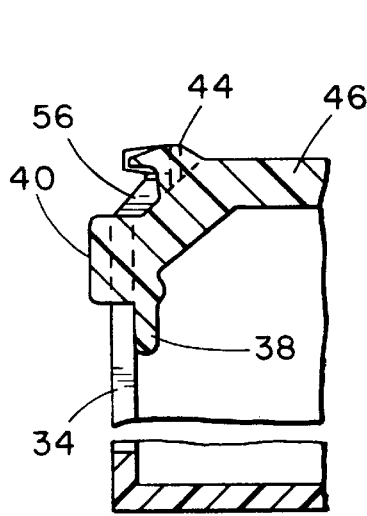
FIG. 15 is a side sectional view of the installed wire retainer of FIG. 2 adjusted to its maximum vertical height position of FIG. 14 taken along line 15—15.
Figure 16:
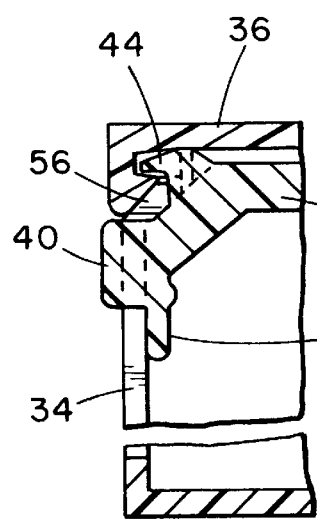
FIG. 16 is a side sectional view of the installed wire retainer of FIG. 2 adjusted to its maximum vertical height position with the wiring duct cover installed.
Figure 17:
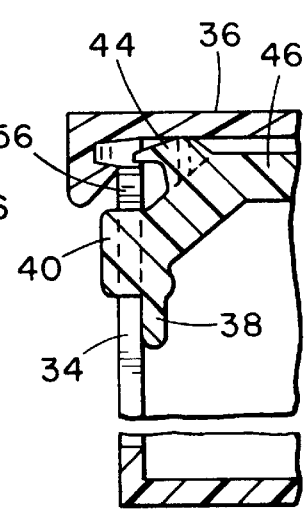
FIG. 17 is a side section view of the wire retainer of FIG. 2 adjusted to its maximum vertical height position installed on a straight walled duct with the cover installed.

A maximum height vertical position is achieved when the snap 44 is pulled upward past the ears 56 of the finger 34, as seen in FIGS. 13–17. In this position, the duct cover 36 may still be installed, thereby accommodating a duct 26 full of wires 24. Further, wire retainer 20 may be used with any type of duct wall including the curved wall and straight wall types, as seen in FIGS. 15–17.

By attaching each wire retainer 20 between two adjacent fingers 34 with an interference fit and substantial retaining walls 38 and 40, the retainer 20 is less likely to become detached when bent or jarred during installation, addition, repair or rearrangement of wires 24 within the duct 26. Effectiveness of the wire retainer 20 for the retention of varying quantities of wires 24 within the duct 26 is enhanced by the capability of being positioned and locked vertically at any selected location. Additionally, the simple installation and removal of the retainer 20 facilitates installation, addition, repair or rearrangement of wires 24 within the duct 26, as well as extraction of wires 24 therefrom.

While the particular embodiments of the present invention have been shown and described, it will be obvious to those skilled in the art that changes and modifications may be made without departing from the invention in its broader aspects. The matter set forth in the forgoing description and accompanying drawings is offered by way of illustration only and not as a limitation. The actual scope of the invention is intended to be defined in the following claims when viewed in their proper perspective based on the prior art.

We claim:

1. A wire retainer for maintaining wires, or cables in a wiring duct having a plurality of resilient fingers defining apertures, which have a height, parallel to the longitudinal extent of the fingers, and a width normal thereto, therebetween, comprising:

an interior retaining wall;

an exterior retaining wall having a height less than one of said apertures' width;

a projection which extends normal to the interior retaining wall; and a duct finger engaging section disposed between a portion of the interior and exterior retaining walls, having a height less than one of said apertures width and substantially similar to the exterior retaining wall height; and a width greater than the duct finger engaging section height, whereby said exterior retaining wall, rotated one-quarter turn, may be inserted through one of said apertures without manipulation of the fingers, and the duct finger engaging section, when rotated one-quarter turn, interferingly engages the fingers to positively secure the wire retainer at any selected vertical height between adjacent said resilient fingers.

2. A wire retainer according to claim 1, wherein the wire retainer further comprises a maximum height snap.

3. A wire retainer according to claim 1, wherein the interior and exterior retaining walls on each side of the duct engaging section define a pair of grooves.

4. A wire retainer according to claim 1, wherein the projection further comprises at least one cut notch.

\* \* \* \* \*